Sept. 27, 1966  R. J. HUFF  3,274,842
LATHE TRANSMISSION MECHANISM
Filed May 18, 1964  3 Sheets-Sheet 1
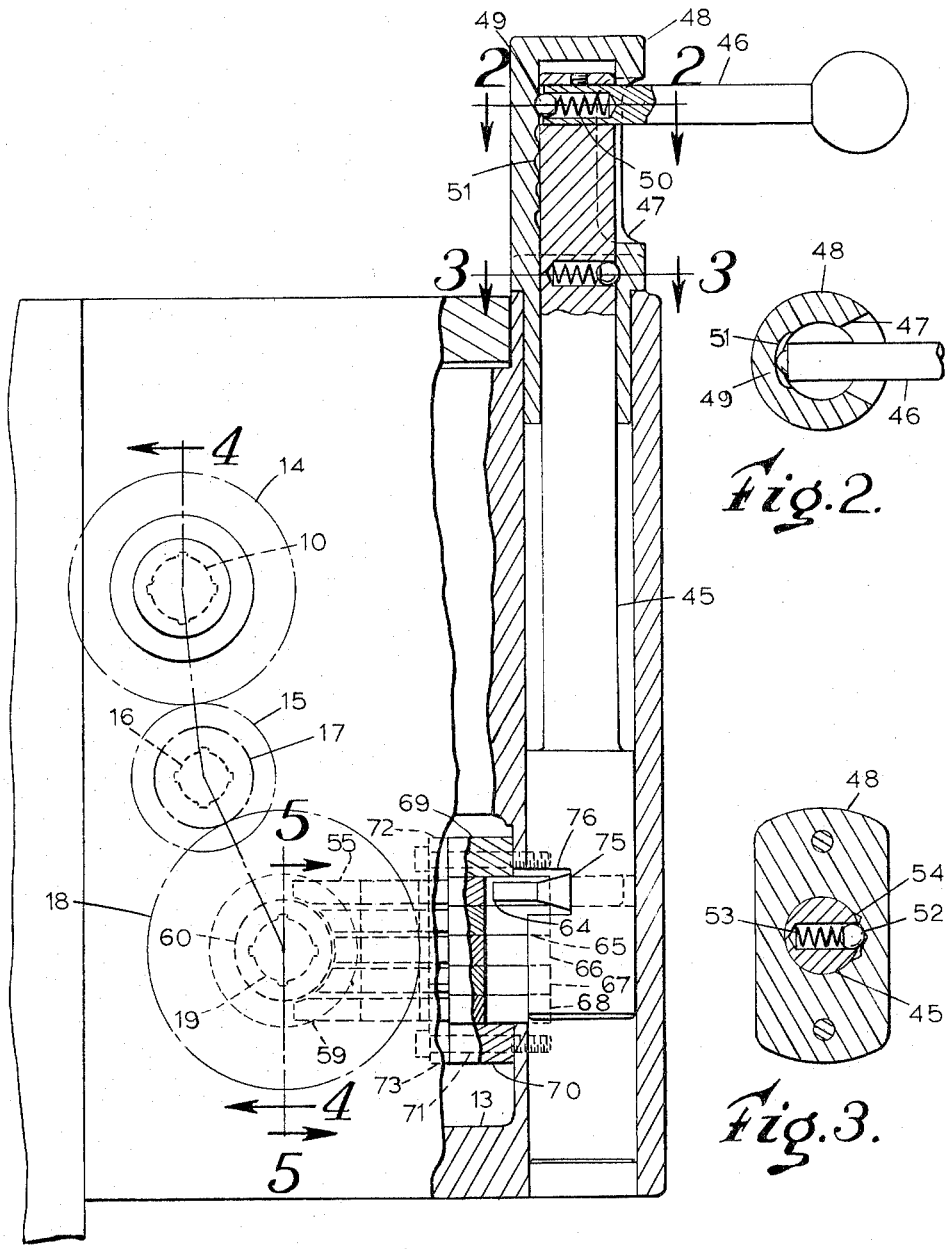
Fig.1.
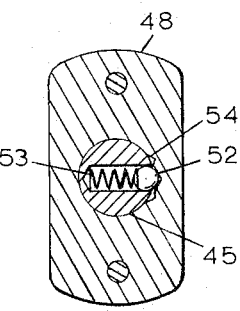
Fig.2.
Fig.3.
INVENTOR.
Robert J. Huff
BY Howard T. Keiser
& Jack J. Earl
ATTORNEYS

United States Patent Office 3,274,842
Patented Sept. 27, 1966

3,274,842
LATHE TRANSMISSION MECHANISM
Robert J. Huff, Xenia, Ohio, assignor to The Cincinnati Milling Machine Co., Cincinnati, Ohio, a corporation of Ohio
Filed May 18, 1964, Ser. No. 368,060
11 Claims. (Cl. 74—335)

The present invention relates to a transmission mechanism and more particularly to a gear shifting mechanism especially suited for a quick change box in a lathe.

It is an object of this invention to provide a shifting mechanism in a lathe quick change box which allows the box to be completely enclosed.

It is a further object of this invention to provide a shifting mechanism by which a selected shifting of gears in a geared transmission using increment and decrement gears can be performed by the simple axial shift and angular rotation of a control bar.

Another object of this invention is to provide a simple shifting mechanism in a geared transmission having multiple pairs of gears designed on increment and decrement principles and fixed on a common shaft which will allow selection of any one of a plurality of gears on another parallel shaft for meshing therewith while positively preventing the meshing of any non-selected gears of the transmission.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form the present gear shifting mechanism is combined in a transmission having a plurality of pairs of gears along a shaft and a plurality of gears spaced along a parallel shaft, each shiftable in one or the other directions from a neutral position to engage one or the other gears in one of the pairs of gears. The design of the two gears of each pair and their engaging gear is based on the principles of incremental and decremental gear design which allow one gear to mesh with one or the other of two gears that have a difference of one or two gear teeth. The shifting is performed by the rotation of a shifter shaft in one or the other directions from a neutral angular position after selected axial positioning of the shaft in one of a plurality of positions corresponding to the number of pairs of increment-decrement gears and to the number of shiftable gears engageable therewith. Only one of a set of laterally movable shifters is connected to be moved and this one shifter is connected to one of the shiftable gears which then is moved in a direction corresponding to the direction of angular movement of the shaft to engage either the incremental or decremental gear of its corresponding pair. The others of the gear shifters are positively held by the shaft from moving and therefore the gears shifted thereby are positively held in their neutral positions to avoid simultaneous engagement of gears to effect different drive ratios between a common input drive and a common output load which otherwise might result in a damaged transmission.

A clear understanding of the construction and operation of the present invention can be obtained from the following detailed description in which reference is made to the attached drawings wherein:

FIG. 1 is a side view, partly in section, of a quick change box for a lathe having a geared feed drive transmission.

FIG. 2 is a section view of the mechanism of FIG. 1 on line 2—2 thereof.

FIG. 3 is a section view of the mechanism of FIG. 1 on line 3—3 thereof.

Figure 4:
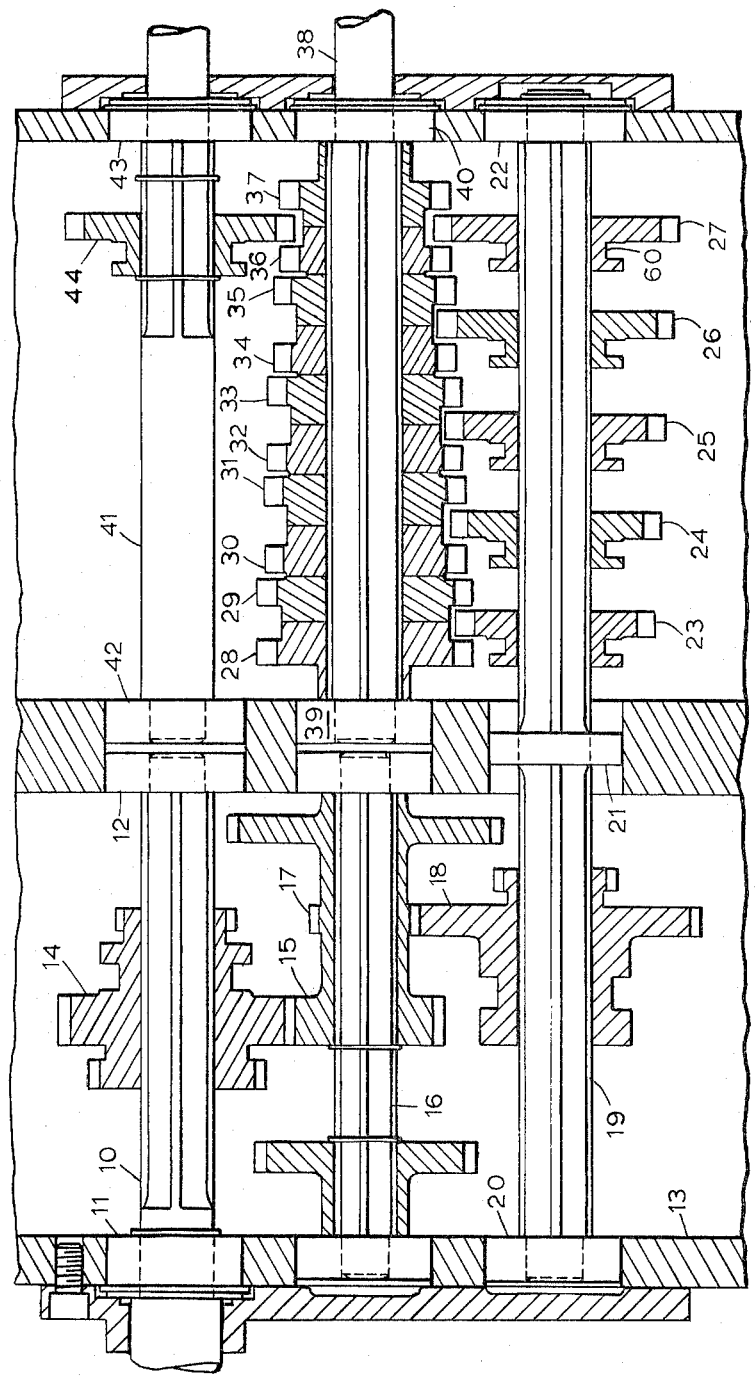
FIG. 4 is a section of the transmission of FIG. 1 on the line 4—4 thereof.

The gear train through which power is transmitted in a quick change box having the shifting mechanism of this invention is shown in FIG. 4. A splined input shaft 10 is journalled in bearings 11, 12 received in a housing 13 which encloses and supports the mechanism. The shaft 10 is rotated by a power source (not shown) such as a motor selectively connectable thereto. A gear 14 is rotatable with the shaft 10 and is movably positionable therealong by a shifter mechanism which forms no part of the present invention and therefore is not shown to simplify this disclosure. The shifting mechanism can be a shifter fork of either the manually actuated or hydraulic powered type, both well known in the machine tool art. As shown, the gear 14 is in mesh with a gear 15 in splined engagement over a second and parallel idler shaft 16. A second toothed portion 17 of the gear 15 is in mesh with a gear 18 that is axially slideable on and is in splined engagement over another parallel shaft 19 journalled in the housing for rotation in bearings 20, 21, 22. The gear 18 is also shiftable on the shaft but is shown without its shifter to simplify this disclosure since it too can be of any well known type as hereinbefore mentioned.

The shaft 19 is splined between the bearings 21, 22 to slidably receive a set of five gears 23-27 at spaced locations therealong. As shown, each of the gears 23-27 is in a neutral position in which it extends between two gears of a series of gears 28-37 each of which is fixed upon a shaft 38 that is parallel to the shaft 19 and is rotatably received in bearings 39, 40. The gears 28-37 are arranged in pairs and each of the gears 23-27 is adapted to engage one or the other of the gears of one pair. For example, the gear 23 is between the pair of gears 28 and 29 when in its neutral position. The gears 23, 28 and 29 are designed in accordance with increment-decrement gear principles and the gear 23 can engage and drive one or the other of the gears 28, 29 to effect two corresponding drive ratios between the shafts 19 and 38. The gear 23, for example, is a 24 tooth, 10.4 diametral pitch gear while the gear 28 is an incremental 27 tooth, 10.4 diametral pitch gear and the gear 29 is a standard 28 tooth, 10.4 diametral pitch gear to provide a one tooth difference between the gears 28, 29. In order to have a two tooth difference the gear 29 might be a decremental 29 tooth, 10.4 diametral pitch gear. Incremental gears and decremental gears can be cut with standard cutters from standard blanks but the blank is indexed during cutting one less or one more time, respectively, and thus the teeth are thicker or thinner than standard gear teeth. The diameter of the pitch circle of an incremental gear when in mesh with a given gear is slightly smaller than that of a standard gear in mesh with the same gear and each tooth has a longer addendum. Conversely a decremental gear has a diameter of pitch circle that is slightly greater than standard and each tooth has a shorter addendum. Thus, two gears rotatable on the same axis and which have a one or two tooth difference can be made for proper meshing with a third gear rotatable on a fixed parallel axis, the third gear being laterally movable for engagement with one or the other of the two gears. It is also possible that in designing for a desired ratio between the gears with a fixed center distance that the shiftable third gear must also be an incremental or a decremental gear.

When one of the driving gears 23–27 is engaged with one of the driven gears 28–37, the drive from the input shaft 10 is transmitted to the shaft 38 in a ratio depending upon the ratios of the described gears therebetween and the shaft 38 is connected to a feed rod (not shown) to produce movement of a lathe slide in a conventional manner. The shaft 38 can also be connected to rotate a shaft 41 rotatable in bearings 42, 43 and connected to a feed screw (not shown) by a shifting of a gear 44 rightward from the position shown to mesh with the gear 37, the shifting of the gear being accomplished by a mechanism of any of the well known types of fork shifting mechanisms already mentioned and which has been omitted herein since it also forms no part of the present invention.

The mechanism by which the gears 23–27 are selectively and individually shiftable one way and the other on the shaft 19 is shown in detail in FIGS. 1–3 and 5–6. The gears 23–27 are selected for shifting by the axial position of a plunger 45 slidably received in the housing 13 for movement at a right angle to the shaft 19. As shown in FIGS. 1 and 2, a handle 46 extends outward from the plunger 45 through an opening 47 in a cap 48 that houses a detent mechanism to hold the plunger in a selected position. The detent mechanism is comprised of a ball 49 in the rear end of the handle 46 which is urged outward by a spring 50. The ball 49 is seated in the uppermost one of a series of five notches 51 and these correspond to the five positions in which each of the gears 23–27, respectively, is selected for shifting. When the plunger 45 is axially positioned, it can also be rotated one way and the other from the neutral position shown in FIGS. 1 and 2 by a swing of the handle 46. The cap 48 also encloses a second detent mechanism, FIG. 3, to hold the plunger in one of three angular positions, it being shown in the neutral position. A ball 52 is received in the plunger 45 and is urged radially outward therefrom by a spring 53 to seat in one of three notches 54 inside the cap 48. The opening 47 as shown in FIG. 2 allows the handle 46 to be swung in either direction from the position shown. It is this swing which shifts the selected one of the gears 23–27.

Figure 6:
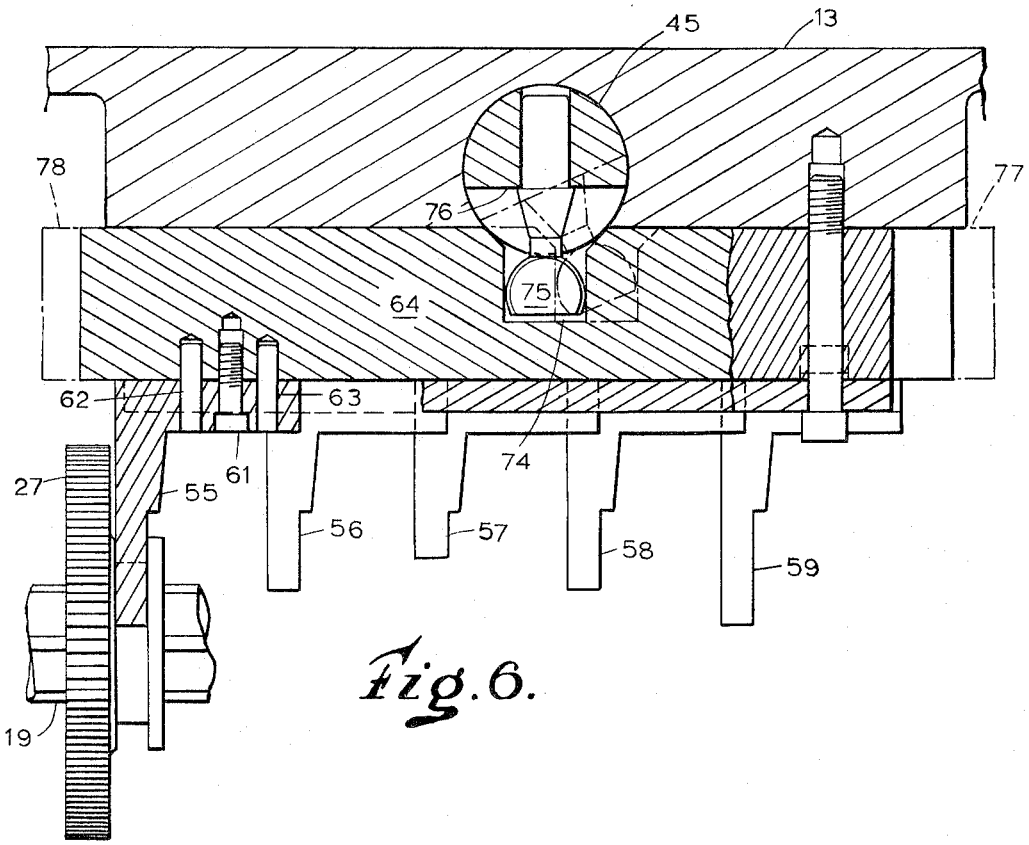
FIG. 6 is a section of the mechanism of FIG. 5 taken on line 6—6 thereof.
Figure 5:
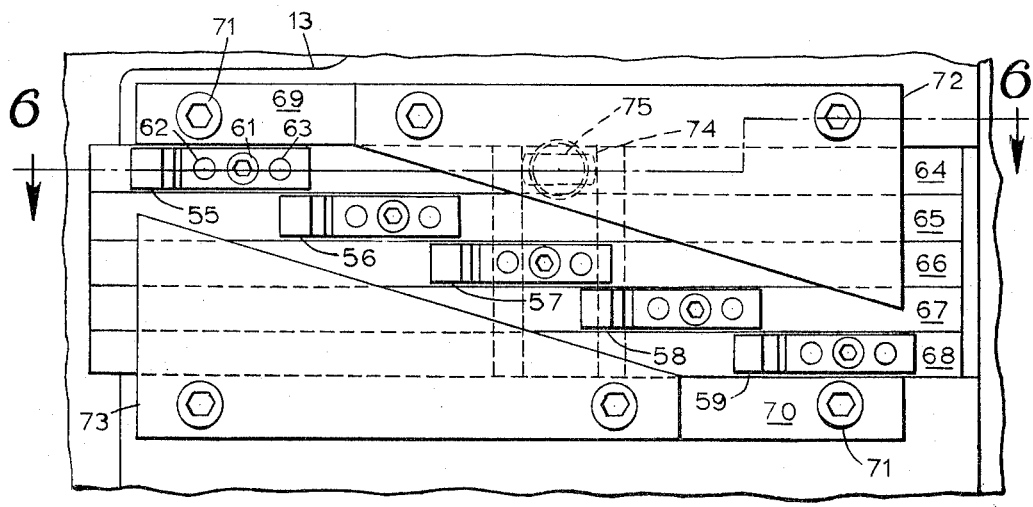
FIG. 5 is a view of the shifting mechanism in the transmission as viewed from line 5—5 of FIG. 1.

The shifting of a selected one of the gears 23–27 in response to axial positioning and rotation of the plunger 45 is performed by the movement of each of a set of shifter fingers 55–59 in a direction parallel to the axis of the shaft 19. Each of the fingers 55–59 extends into a neck 60 formed on each of the gears 23–27, respectively, and as these fingers are moved, the gears are pushed along the shaft 19. As shown in FIGS. 5 and 6, the fingers 55–59 are each attached by screws 61 and pins 62, 63 to extend outward from the side of one of a set of plates 64–68. The plates 64–68 are held in a loose stack for slidable movement one way and the other in the direction of their longest dimension which is parallel to the shaft 19. The plates are held between bracket members 69, 70 which are secured inside the housing 13 by screws 71. A pair of plates 72, 73 are attached to the bracket members 69, 70 respectively and these hold the plates 64–68 in the space between the bracket members and define a diagonal channel through which the fingers 55–59 extend and across which they are movable.

As best shown in FIG. 6, each of the plates 64–68 has a notch 74 therein which is adapted to receive a bell-end lever 75 that is fixed in the plunger 45 at the bottom of a notch 76 therein. The dimension of the notch 74 in the axial direction of the plunger 45 is slightly greater than the thickness of each of the plates 64–68 so that when the notch 76 is aligned with any one of them, that one plate is free to move laterally parallel to the shaft 19 and perpendicular to the plunger 45. Each of the notches 74 in the plates 64–68 is chamfered to fit closely to the cylindrical surface of the plunger 45 so that unless the notch 76 is aligned with a plate 64–68, it cannot be shifted laterally in either direction from its neutral position. Thus only one of the plates 64–68 can be moved at any one time since the notch 76 is only slightly wider than the plate depth. The five axial positions of the plunger 45 defined by the detent notches 51 correspond to the positions in which the notch 76 is in alignment with one of the plates 64–68. As indicated by the phantom position of the lever 75 in FIG. 6, when the notch 76 is in alignment with the plate 64 and the plunger 45 is rotated counter-clock-wise from its neutral position, the plate 64 is shifted to the position indicated as 77 and the gear 27 is moved along the shaft 19 to engage the gear 36. If the plunger 45 is rotated in the clockwise direction, the plate will shift to the position 78 and the gear 27 will mesh with the other gear 37.

From the foregoing description, it can be seen that the plunger 45 is positioned in one of five predetermined positions to select one of the gears 23–27 for shifting from its neutral position. The plunger 45 is then rotated one way or the other to shift that selected gear along the shaft 19. At the same time all of the others of the gears 23–27 but the selected gear are positively held in their neutral positions and cannot creep or be accidentally shifted into engagement simultaneously with the selected gear. While the invention has been described in connection with one possible form or embodiment thereof, it is to be understood that the present disclosure is illustrative rather than restrictive and that changes and modifications may be made without departing from the spirit of the invention or the scope of the claims which follow.

What is claimed is:

1. In a transmission having a plurality of pairs of first gears fixed on a first shaft and a plurality of second gears each axially movable on a second shaft parallel to the first shaft and adapted to engage one and the other of the first gears of a pair when shifted one way and the other from a neutral position, a shifting mechanism comprising:

(a) an axially and rotatably movable control member,
 (b) means for defining a series of predetermined axial positions of said control member corresponding to the number of pairs of second gears,
 (c) means for defining a neutral angular position and two engaging angular positions on opposite sides thereof for said control member,
 (d) a set of shifter members connected, respectively, to said second gears, each of said shifter members operable to move one of the second gears connected thereto along the second shaft,
 (e) means for rendering a selected one only of said shifter members operable for moving the one of the second gears connected thereto from the neutral position thereof in one and the other directions along the second shaft when said control member is in each of said predetermined axial positions,
 (f) means for operating the selected one of said shifter members in response to angular movement of said control member to one and the other of said engaging positions to move the one of the second gears connected thereto in one and the other directions, respectively, from the neutral position thereof, and
 (g) means for axially moving said control member from one to another of said predetermined axial positions and for rotation thereof to each of the engaging positions.

2. The transmission gear shifting mechanism of claim 1 wherein:

(a) said shifter members are a set of plates each having a shifter extending laterally therefrom and connected to the respective one of said second gears, and
 (b) means are included for supporting said plates in a stack for movement of each parallel to the second shaft when rendered operable.

3. The transmission gear shifting mechanism of claim 2 wherein:
   (a) said control member is a plunger extending in its axial direction transversely relative to said stack of plates,
   (b) said plates are of uniform thickness from one to another, and
   (c) a notch is formed in said plunger having a width slightly in excess of the thickness of one of said plates, said notch being in registration with one only of said plates in each of said predetermined axial positions of said plunger, said one plate movable through said notch parallel to the second shaft to be rendered operable.

4. The transmission gear shifting mechanism of claim 3 wherein:
   (a) each of said plates has a notch in the side thereof, said plate notches being in alignment along said plunger when said plates are positioned to hold all of the second gears in the neutral positions thereof,
   (b) said plunger is positioned adjacent said plates and parallel to said aligned plate notches, and
   (c) a bell end lever is fixed in said plunger at the bottom of the notch therein and extends into the notch of the plate in registration therewith to shift said plate when said plunger is rotated to one of said engaging positions.

5. The transmission gear shifting mechanism of claim 4 wherein:
   (a) each of said plate notches is chamfered at the outer corner areas thereof, and
   (b) said plunger extends into the plate notches at said chamfered corner areas and is axially movable therethrough, each of said plates being adapted to engage said plunger to prevent movement of said plates except when said plunger notch is in registration therewith.

6. In a transmission having a plurality of first gears fixed on a first shaft and a plurality of second gears each axially movable along a second parallel shaft from a neutral position to engage a corresponding one of the first gears, a shifting mechanism comprising:
   (a) an axially and rotatably movable control member,
   (b) means for defining a series of predetermined axial positions of said control member,
   (c) means for defining a neutral angular position and an engaging angular position of said control member,
   (d) a set of plates each having a shifter finger extending therefrom and connected to a respective one of said second gears,
   (e) means for supporting said plates in a loose stack for movement of each parallel to the second shaft when rendered operable,
   (f) means dependent upon axial movement of said control member to one of the predetermined axial positions for rendering a corresponding one of said plates operable for movement,
   (g) means for moving said plate corresponding to the axial position of the control member in response to rotation of the control member to and from the neutral angular position whereby a corresponding one of said second gears is movable along said second shaft to and from the neutral position thereof, and
   (h) means for axially moving said control member from one to another of said axial positions thereof when the control member is in the neutral angular position and for rotation thereof to the angular engaging position when said control member is in one of said axial positions.

7. The transmission shifting mechanism of claim 6 wherein:
   (a) said control member is cylindrical and extends transversely relative to said plates,
   (b) said plates are of uniform thickness from one to another,
   (c) a notch is formed in said control member having a width slightly in excess of the thickness of said plates, said notch being in registration with one only of said plates in each of said predetermined axial positions of the control member, said plates being rendered operable for movement through the notch when in registration therewith.

8. The transmission shifting mechanism of claim 7 wherein:
   (a) each of said plate notches is chamfered at the outer corner areas thereof,
   (b) said control member extends into the notches at said chamfered corner areas and is axially movable therethrough, said plates being prevented from moving by said control member except when said notch in the control member is in registration therewith, and
   (c) a bell end lever is fixed in said control member at the bottom of said notch therein and extends into the notches of said plates when each plate is in registration with said notch in the control member for selective movement of the plates in accordance with angular movement of the control member.

9. A transmission gear shifting mechanism for selective shifting of one of a plurality of gears movable along a shaft comprising:
   (a) a set of plates each having a shifter finger extending therefrom and in operative connection with a respective one of said gears for movement along the shaft when said plates are moved in a direction parallel thereto,
   (b) means for supporting said plates parallel and adjacent to one another for movement of each parallel to the shaft,
   (c) a control plunger axially movable in a direction transverse to said plates and shaft to each of a series of predetermined axial positions and rotatably movable in each of said axial positions for a neutral angular position to an engaging angular position,
   (d) means dependent upon axial movement of said control member to one of the predetermined axial positions for rendering a corresponding one of said plates movable, and
   (e) means for moving said plate corresponding to the axial position of said control member in response to rotational movement of the control member from the neutral angular position.

10. The transmission gear shifting mechanism of claim 9 wherein:
    (a) said control member is selectively rotatable in one and the other directions from the neutral angular position thereof to produce selected movement of each said plates in one and the other directions for bilateral shifting of said gears along the shaft.

11. The transmission gear shifting mechanism of claim 9 wherein:
    (a) said plates are each of the same uniform thickness and each has a notch therein chamfered at the outer corner areas thereof,
    (b) said control member is cylindrical and extends into each of said plates at the chamfered corner areas thereof,
    (c) a notch having a width slightly larger than the thickness of each of said plates is formed in said control member parallel to said plates and shaft,
    (d) said notch in the control member is in registration with a corresponding one of said plates when said control member is in each of said predetermined axial positions thereof, and
    (e) a bell end lever is fixed in said control member notch and extends into the notches of said plates when each plate is in registration with the notch in said control member for selective movement of the plates through the notch in said control member in accordance with rotation of the control member.

References Cited by the Examiner
UNITED STATES PATENTS

| | | | |
|---|---|---|---|
| 2,332,381 | 10/1943 | Hoelscher | 74—382 |
| 2,535,381 | 12/1950 | Andrews | 74—473 |
| 2,748,910 | 6/1956 | Klecker | 74—335 |

DAVID J. WILLIAMOWSKY, *Primary Examiner.*

H. S. LAYTON, *Assistant Examiner.*